April 2, 1946.  E. MARTIN ET AL  2,397,876
GOVERNOR CONTROL MECHANISM
Filed July 26, 1939
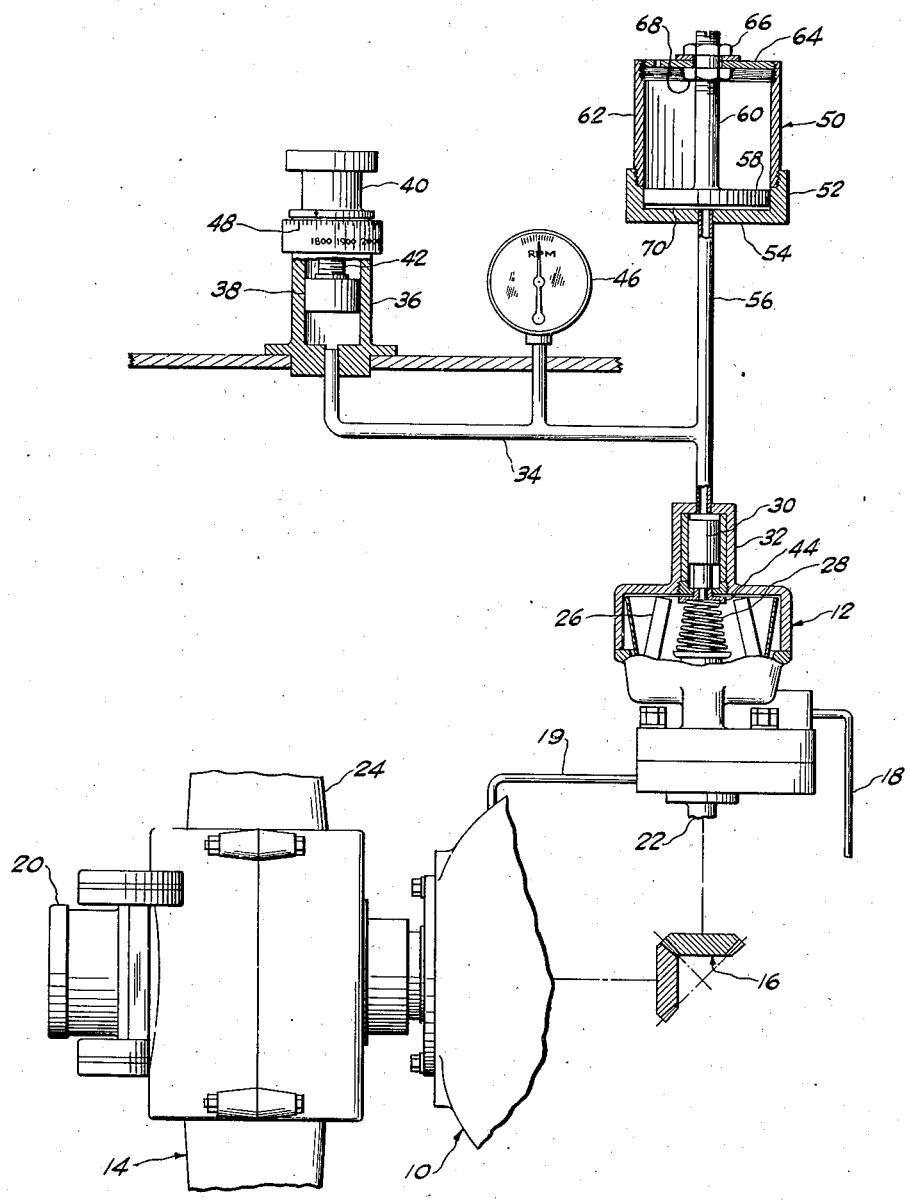
INVENTORS
Erle Martin
Edwin D. Eaton
BY
Harris G. Luther
ATTORNEY

Patented Apr. 2, 1946

2,397,876

UNITED STATES PATENT OFFICE 2,397,876

GOVERNOR CONTROL MECHANISM

Erle Martin, West Hartford, and Edwin D. Eaton, Wethersfield, Conn., assignors to United Aircraft Corporation, East Hartford, Conn., a corporation of Delaware Application July 26, 1939, Serial No. 286,590

5 Claims. (Cl. 60—54.5)

This invention relates to improvements in temperature compensators for hydraulic systems and has particular reference to improved means for compensating expansion and contraction of hydraulic fluid induced by temperature changes in a closed system.

An object of the invention resides in the provision of an improved mechanism adapted to be connected to a closed hydraulic system to compensate the changes in volume in the hydraulic fluid in the system induced by changes in the temperature of the fluid and the fluid containing structure.

A somewhat more specific object resides in the provision of a temperature compensator for maintaining the accuracy of a hydraulic adjusting system, such as a governor setting system, so that the governor setting will always respond accurately to the indicated setting of the adjustment regardless of the temperature of the system.

Other objects and advantages will be more particularly pointed out hereinafter or will become apparent as the description proceeds.

In the accompanying drawing, in which like reference numerals are used to designate similar parts throughout, there is illustrated, by way of example, a suitable mechanical embodiment of a compensator constructed according to the invention. The drawing, however, is for the purpose of illustration only and is not to be taken as limiting or restricting the scope of the invention.

In the accompanying drawing, the single figure is a somewhat diagrammatic illustration of a hydraulic governor adjusting mechanism for the speed controlling governor of an engine propeller combination and a temperature compensator constructed according to the invention applied thereto, certain parts of the combination being shown in section to better illustrate the construction thereof.

Referring to the drawing in detail, the numeral 10 generally indicates a propeller driving engine, which may be any form of engine the speed of which is to be regulated by the speed responsive centrifugal governor, generally indicated at 12. The governor may regulate the speed of the engine by controlling the pitch of a controllable-pitch propeller, generally indicated at 14, driven by the engine.

For a more detailed description of a suitable speed controlling centrifugal governor reference may be had to British Patent Number 470,284, accepted August 12, 1937, issued to the Woodward Governor Company, or to United States Patent Number 2,204,640, issued June 18, 1940, to Elmer E. Woodward, and for a detailed description of a suitable controllable-pitch propeller reference may be had to United States Patent Number 2,032,255, issued February 25, 1936, to Frank W. Caldwell. In the conventional arrangement a governor is driven from the engine by a suitable driving connection, such as is generally indicated at 16, and controls the application of hydraulic fluid under pressure from the fluid pressure line 18 which leads through the governor and a feed line 19 to the hydraulic control mechanism 20 of the propeller, the governor being provided with a suitable valve operative to connect the hydraulic mechanism 20 with the pressure line 18 or with a drain 22 to decrease or increase the pitch of the propeller blade 24 in response to the speed demands of the governor in a manner well known to the art.

The governor is provided with centrifugally actuated flyballs 26 which react against a governor speeder spring 28 to control the position of the governor actuated valve. With this arrangement the governor will act to maintain the speed of the engine constant by changing the pitch of the propeller 14 and will maintain a predetermined rate of engine speed for any particular setting of the speeder spring 28. The rate of engine speed may obviously be changed by changing the setting of the speeder spring and this may be accomplished by the hydraulic apparatus including the piston 30 reciprocable in the cylinder 32, the conduit 34, the cylinder 36 and the adjustable piston 38 movable in the cylinder 36. The conduit 34, the space within the cylinder 36 below the piston 38 and the space within the cylinder 32 above the piston 30 are filled with hydraulic fluid. The piston 38 may conveniently be moved in the cylinder 36 by a manually operable knob 40 which receives a screw shaft 42 extending from the piston and the piston 30 may change the setting of the spring 28 by moving a movable abutment 44 for the upper end of the spring. With this arrangement if the piston 38 is moved downwardly in the cylinder 36 the piston 30 will be moved downwardly in the cylinder 32 and the load on the spring 28 will be increased. When the piston 38 is moved upwardly in the cylinder 36 hydraulic fluid will move from the space in the upper end of the cylinder 32 to the space in the lower end of the cylinder 36 thereby permitting the piston 30 to rise and decrease the loading on the speeder spring.

The speed setting of the governor may be indicated by a suitable indicator 46 which is connected into the conduit 34 and responds to the pressure of the hydraulic fluid in the piston or, the governor setting may be indicated directly by means of indicia 48 on the manual control 40. If the indicia 48 are relied upon to indicate the governor setting it is apparent that if the pressure of the hydraulic fluid in the system varies with temperature changes due to unequal expansion of the fluid and the fluid containing cylinders and conduits the indicia 48 will be accurate at only the one temperature at which the system is calibrated. In order to obtain a condition in which a particular setting of the manual control 40 will always correspond to a particular speed setting of the governor regardless of the temperature of the hydraulic adjusting mechanism, a temperature compensating device, generally indicated at 50, may be incorporated into the system.

This device may conveniently include a cylinder 52 having a closed end 54 provided with an aperture through which a conduit 56 extends to connect the interior of the cylinder with the hydraulic fluid in the governor adjusting system; a piston 58 disposed in the cylinder and having a rod 60 connected at its outer end to the outer end of a cylinder extension 62 by suitable means such as the plate 64 screw threaded into the outer end of the cylinder extension. The cylinder 52 may be made of any suitable material and provided in its open end with internal screw threads for the reception of the screw threaded end of the extension 62. The outer end of the cylinder extension 62 is internally screw threaded to receive the plate 64, and the plate 64 is centrally apertured to receive the rod 60. The rod is provided with screw threads at its outer end for the reception of the nuts 66 and 68 by means of which the rod can be adjustably secured to the plate. The rod 60 and the cylinder extension 62 are made of material having different coefficients of temperature expansion so that the space 70 between the piston 58 and the closed end 54 of the cylinder 52 is changed with changes in the temperature of the system. The material of the members 60 and 62 are so selected and the dimensions of these members are so proportioned that the volume of the space 70 varies in accordance with the differential expansion of the hydraulic fluid and the fluid containing system so that the pressure of the fluid in the system is maintained constant for any given setting of the piston 38 regardless of temperature variations. Minor adjustments to calibrate the compensator 50 to the particular system may be made by adjusting the nuts 66 and 68 and changing the relative position of the plate 64 in the cylinder extension 62 by screwing the plate into or out of the cylinder extension.

While a suitable mechanical arrangement for the purpose of disclosing the invention has been hereinabove described and illustrated in the accompanying drawing it is to be understood that the invention is not limited to the particular arrangement so illustrated and described but that such changes in the size, shape and arrangement, and constituent material of the various parts may be resorted to as come within the scope of the subjoined claims.

Having now described the invention so that others skilled in the art may clearly understand the same, what it is desired to secure by Letters Patent is as follows:

1. In combination with a closed system containing hydraulic fluid, means for compensating differential expansions of said system and said fluid incident to temperature variations comprising, a variable volume container hydraulically connected with said system, and a pair of substantially rigid elements of materials of respectively different heat expansion coefficients having one pair of corresponding ends connected respectively to opposite walls of said container, and manually adjustable means connecting the other ends of said elements together to adjust the volume of said container to the volume of hydraulic fluid contained therein at any selected temperature and to vary the volume of said container in response to said temperature variations.

2. In combination with a closed system containing hydraulic fluid, means for compensating differential expansions of said system and said fluid incident to temperature variations comprising, a variable volume container hydraulically connected with said system, a cylinder of a material of one heat expansion coefficient connected to one wall of said container, a stem of a material of a different heat expansion coefficient connected to the other wall of said container, and adjustable means connecting said stem to said cylinder at the ends opposite said container.

3. In combination with a closed system containing hydraulic fluid, means for compensating differential expansions of said system and said fluid incident to temperature variations comprising, a variable volume container hydraulically connected with said system, a cylinder of a material of one heat expansion coefficient connected to one wall of said container, a stem of a material of a different heat expansion coefficient concentric with said cylinder and connected to the other wall of said container, an apertured plate screw threaded into the end of said cylinder opposite the end connected to said container, said stem having a screw threaded end portion extending through said aperture, and nuts threaded on said stem on opposite sides of said plate, whereby differential expansion of said cylinder and said stem will vary the volume of said container in response to said temperature variations.

4. In combination with a closed system containing hydraulic fluid, means for compensating differential expansions of said system and said fluid incident to temperature variations comprising, a variable volume container hydraulically connected with said system, and means for varying the volume of said container in response to said temperature variations comprising, a cylinder of a material of one heat expansion coefficient connected at one end to said container, a stem of a material of a different heat expansion coefficient concentric with said cylinder, means adjustably connecting one end of said stem with the end of said cylinder opposite the end connected to said container, and a piston on the other end of said stem constituting a movable wall of said container.

5. In combination with an adjustable speed responsive governor and means for adjusting said governor comprising a fluid pressure actuated device operatively connected with the governor, a manually operable fluid displacement device, and a fluid line connecting said devices; a variable volume container hydraulically connected with said line, one portion of said container being rigidly connected to the remainder of said container by at least two metal elements having respectively different heat expansion coefficients to vary the volume of said container in response to temperature variations and arranged so that expansion of one element tends to increase the volume of the container and expansion of the other element tends to decrease the volume of the container to thereby compensate for the differential expansion of the fluid and the fluid line.

ERLE MARTIN.
EDWIN D. EATON.